United States Patent [19]

Doyle

[11] 4,160,731

[45] Jul. 10, 1979

[54] PROCESS FOR DEWATERING SEWAGE SLUDGES DISINFECTED WITH LIME

[75] Inventor: Carlos L. Doyle, Franklin, Ind.

[73] Assignee: American Cyanamid Company, Stamford, Conn.

[21] Appl. No.: 897,474

[22] Filed: Apr. 18, 1978

[51] Int. Cl.² ............................................. C02C 3/00
[52] U.S. Cl. ........................................ 210/50; 210/10; 210/53; 210/54
[58] Field of Search .................. 210/10, 18, 52–54, 210/50, 51, 59, 64

[56] References Cited

U.S. PATENT DOCUMENTS

| 3,752,760 | 8/1973 | Gordon et al. | 210/54 X |
| 3,897,333 | 7/1975 | Field et al. | 210/10 |
| 3,943,114 | 3/1976 | Hoke | 210/54 X |
| 4,028,238 | 6/1977 | Allan | 210/53 |

*Primary Examiner*—Thomas G. Wyse
*Attorney, Agent, or Firm*—William J. van Loo

[57] ABSTRACT

A copolymer of acrylamide and 3-(methacrylamido)-propyl-trimethyl ammonium chloride is effective in the dewatering of sewage sludges that have been disinfected with lime.

5 Claims, No Drawings

PROCESS FOR DEWATERING SEWAGE SLUDGES DISINFECTED WITH LIME

This invention relates to an improved process for dewatering sewage sludges. More particularly, this invention relates to such a process wherein the recovered solids is suitable for direct disposal as landfill.

Flocculation of aqueous dispersions is an important operation. Such aqueous dispersions have two phases, one of which is a continuous outer aqueous phase regardless of whether the disperse phase or phases are suspensions of fine particles or much larger particles. Such systems include river water having small amounts of suspended solids as well as industrial and municipal wastes, such as sewage, sewage sludge to be dewatered, and industrial product dispersions such as washes from the fermentation processes for producing such materials as enzymes and the like. Such aqueous dispersions have a disperse phase having a negative charge.

In order to flocculate aqueous dispersions where the disperse phase has negative charges, it has been customary in the past to use materials such as alum, ferric salts, and the like which are transformed into the hydroxides or to use organic cationic flocculants, which neutralize the negative charge. Cationic flocculants, including polyquaternary compounds, are extensively used.

The physical properties that are responsible for effective performance of various flocculants are not precisely predictable. There is no good correlation between property modifications that result in more effective performance with one flocculant type and those property modifications that result in more effective performance with another flocculant type. Although some physical properties are shared by certain effective flocculants, the effect of variation of individual properties thereof does not appear to have been investigated to any great extent nor do the results of limited investigations lead to any consistent conclusions.

The dewatering of sewage sludges is a particularly difficult operation to carry out and only a limited number of cationic flocculants have been found efficient in this operation. Useful flocculants generally must have a proper balance between molecular weight and charge density. Many monomeric materials although having high charge densities cannot be polymerized to high enough molecular weight values to be effective in sewage sludge dewatering. Other monomeric materials while providing high molecular weight polymers do not provide sufficient charge density to be efficient in dewatering sewage sludges. Thus, even in the routine processing of sewage sludges, the choice of efficient flocculants to provide sludge dewatering is very limited.

A complication that further affects the processing of sewage sludges is the manner of disposal of the solids recovered from such sludges. A particularly desirable method of disposal of such solids is as landfill. However, to dispose of such solids as landfill, it is necessary that they be thoroughly disinfected. A convenient method of disinfecting the sewage sludges is to add sufficient lime thereto to provide high pH values of at least about 12.0 or more, usually up to about pH 12.5. When the sewage sludge is thus disinfected to provide solids that can be useful in landfill, it is much more difficult to dewater efficiently and most cationic flocculants useful in dewatering sewage sludges at pH values in the conventional range, i.e., about 7.0, are not useful at the high pH values.

Accordingly, there exists the need for a process for providing disinfected solids from sewage sludges that can be employed as landfill while still effecting efficient dewatering of said sewage sludges. Such a provision would fulfill a long-felt need and constitute a significant advance in the art.

In accordance with the present invention, there is provided a process for recovering disinfected solids suitable for use as landfill from sewage sludge which process comprises treating said sewage sludge with an amount of lime sufficient to provide a pH of at least 12.0, adding to the thus-treated sludge an effective amount of a copolymer containing repeating units of

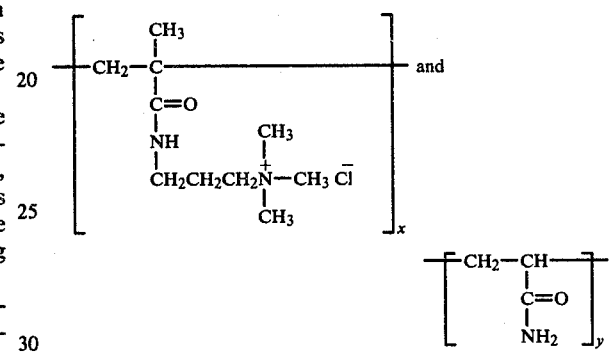

wherein x represents a mole percent in the range of about 3–60 and y, correspondingly, represents a mole percent in the range of about 97–40, said copolymer having a standard viscosity of at least about 1.5 cps filtering the resulting sludge to remove water therefrom, and disposing of the disinfected solids thus obtained as landfill.

The process of the present invention provides a disinfected solids useful directly as landfill while providing an efficient rate of dewatering of the sewage sludge being processed. This result is surprising and highly unexpected in view of the fact that many commercial quaternary flocculants are inefficient in such processing.

In carrying out the process of the present invention, dewatering of the sewage suldge is conducted according to conventional procedures except for the provisions for lime and specified polyquaternary flocculant. Lime, calcium oxide, is added to the sewage sludge in a quantity sufficient to provide a pH of at least 12.0 and up to about 12.5. Since it is desired that the recovered solids be used as landfill directly from processing, the treatment with lime should be sufficient to disinfect the sewage sludge completely. Typically, the use of lime will be about 100 pounds per ton of dry sludge solids.

The polyquaternary flocculant to be used in accordance with the process of the present invention is one containing repeating units of

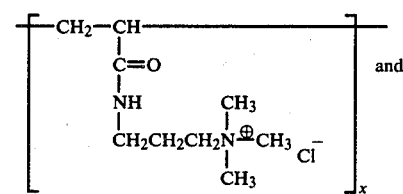

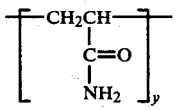

wherein x is a mole percent in the range of about 3 to 60 and y is a mole percent, correspondingly, in the range of about 97 to 40, preferably x is about 10 mole percent and y is about 90 mole percent. The preferred mole ratio provides a copolymer that has both the necessary high molecular weight and charge density. The polymer will have a molecular weight corresponding to a standard viscosity of at least about 1.5 centipoises, preferably at least about 2.5 centipoises. Such viscosities define polymers of molecular weights in excess of about one million, preferably in excess of about 3 million.

The invention is more fully illustrated in the examples which follow wherein all parts and percentages are by weight unless otherwise specified.

Standard viscosity is the viscosity of a 0.10% copolymer solution in 1N NaCl measured with a Brookfield LVT viscometer at pH 5.5, 25° C., and 60 rpm.

EXAMPLE 1

In a major municipal sewage treatment plant in Colorado, sewage was treated with lime at a rate of 100 pounds per ton of dry sludge solids providing a sludge pH of 12.0. In order to filter the sewage sludge at an effective rate, 2.24 pounds per ton of dry sludge solids were required of a copolymer containing 90 mole percent of acrylamide and 10 mole percent of 3-(methacrylamido)propyl-trimethylammonium chloride, the polymer having a standard viscosity of about 3 cps. Effective filtration was accomplished providing a filter cake of disinfected sludge solids which were disposed of as landfill.

COMPARATIVE EXAMPLE A

Following the procedure of Example 1 above, a copolymer of dimethylaminoethyl methacrylate:acrylamide 90:10 was employed in place of the polymer used in Example 1. This polymer also had a standard viscosity of about 3 cps. Effective filtration could not be accomplished using this copolymer in spite of the fact that it provides effective filtration of sewage sludges when lime is not employed.

COMPARATIVE EXAMPLE B

The procedure of Example 1 was again followed except that in place of the polymer used therein, there was employed a copolymer of 67 mole percent of acrylamide and 33 mole percent of diallyldimethylammonium chloride of standard viscosity of about 3 cps. In order to provide effective filtration, a polymer dosage of about 5 pounds per ton of dry sludge solids had to be employed. Compared to the usage of the copolymer of the invention, this represents over 200% increase in polymer dosage.

EXAMPLE 2-6

Sewage sludge obtained from a Connecticut municipal sewage plant was limed following the procedure of Example 1 to provide a sludge pH of 12.0. The sludge had a consistency of 4%. The polymer employed had the same composition as that of Example 1 and a standard viscosity of 3.2 cps. It was employed at various dosage levels and filtration rates were determined as milliliters of filtrate in 1 minute of filtration. Results and details are given in Table I.

COMPARATIVE EXAMPLES C–G

The procedure of Example 2–6 was again followed using a polymer composition of 90 mole percent acrylamide and 10 mole percent of methacryloyloxyethyl-trimethylammonium chloride. The polymer had a standard viscosity of 3.7 cps. Results and details are also given in Table I.

The results show the superior performance of polymers of the invention.

TABLE I

| FILTRATION RATES OF LIMED SEWAGE SLUDGE | | |
|---|---|---|
| EXAMPLE | Polymer Dosage (lbs/ton) | MLS FILTRATE IN 1 MINUTE |
| 2 | 1.22 | 34 |
| 3 | 3.68 | 49 |
| 4 | 5.51 | 73 |
| 5 | 6.76 | 94 |
| 6 | 8.00 | 112 |
| Comp. C | 1.22 | 30 |
| " D | 3.68 | 34 |
| " E | 5.51 | 43 |
| " F | 6.76 | 51 |
| " G | 8.00 | 51 |

I claim:

1. A process for recovering disinfected solids suitable for use as landfill from sewage sludge which process comprises treating said sewage sludge with an amount of lime sufficient to provide a pH of at least 12.0, adding to the thus treated sludge an effective amount of a copolymer containing repeating units of

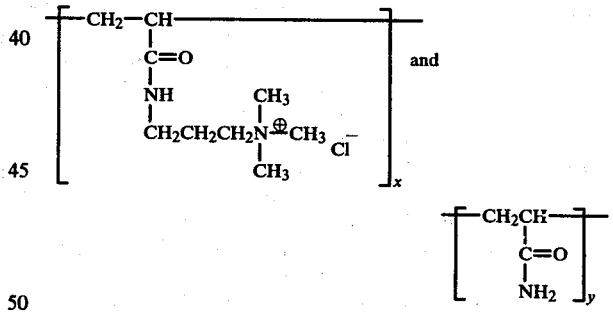

wherein x represents a mole percent in the range of about 3–60 and y, correspondingly, a mole percent in the range of about 97–40, said copolymer having a standard viscosity of at least about 1.5 cps., filtering the resulting sludge to remove water therefrom, and disposing of the disinfected solids thus obtained as landfill.

2. The process of claim 1 wherein the amount of lime employed is sufficient to provide a pH of 12.5.

3. The process of claim 1 wherein said copolymer has a standard viscosity of at least about 2.5 cps.

4. The process of claim 1 wherein x represents a mole percent of about 10 and y represents a mole percent of 90.

5. The process of claim 4 wherein said copolymer has a standard viscosity of at least 2.5 cps.

UNITED STATES PATENT OFFICE
CERTIFICATE OF CORRECTION

Patent No. 4,160,731      Dated July 10, 1979

Inventor(s) Carlos L. Doyle

It is certified that error appears in the above-identified patent and that said Letters Patent are hereby corrected as shown below:

In the Specification:

Column 2, line 61, that portion of the formula reading

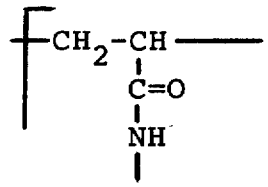     should read     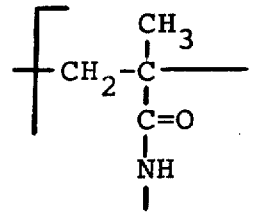

In the Claims:

Column 4, line 37, that portion of the formula reading

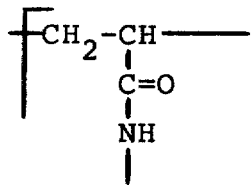     should read     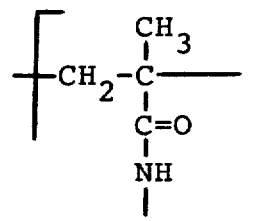

Signed and Sealed this

Fourth Day of March 1980

[SEAL]

Attest:

SIDNEY A. DIAMOND

Attesting Officer      Commissioner of Patents and Trademarks